United States Patent
Kwon et al.

(10) Patent No.: US 9,088,970 B2
(45) Date of Patent: Jul. 21, 2015

(54) DIRECT COMMUNICATION BETWEEN DEVICES

(75) Inventors: Yeong Hyeon Kwon, Gyeonggi-do (KR); Ji Woong Jang, Gyeonggi-do (KR); Hyun Woo Lee, Gyeonggi-do (KR); Han Gyu Cho, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 198 days.

(21) Appl. No.: 13/642,592

(22) PCT Filed: Apr. 25, 2011

(86) PCT No.: PCT/KR2011/002995
§ 371 (c)(1),
(2), (4) Date: Oct. 22, 2012

(87) PCT Pub. No.: WO2011/133004
PCT Pub. Date: Oct. 27, 2011

(65) Prior Publication Data
US 2013/0039324 A1 Feb. 14, 2013

Related U.S. Application Data

(60) Provisional application No. 61/327,111, filed on Apr. 23, 2010.

(51) Int. Cl.
*H04W 72/04* (2009.01)
*H04W 76/02* (2009.01)
*H04W 92/18* (2009.01)

(52) U.S. Cl.
CPC ............ *H04W 76/023* (2013.01); *H04W 72/04* (2013.01); *H04W 92/18* (2013.01)

(58) Field of Classification Search
None
See application file for complete search history.

(56) References Cited

U.S. PATENT DOCUMENTS

| 5,903,618 A * | 5/1999 | Miyake et al. ............... 375/356 |
| 7,734,292 B2 * | 6/2010 | Cho et al. ..................... 455/436 |
| 2006/0166688 A1 * | 7/2006 | Sun et al. ...................... 455/502 |

(Continued)

FOREIGN PATENT DOCUMENTS

| KR | 10-2009-0005604 A | 1/2009 |
| KR | 10-2009-0080551 A | 7/2009 |

OTHER PUBLICATIONS

Search Report issued in corresponding International Application No. PCT/KR2011/002995 dated Nov. 29, 2011.

*Primary Examiner* — Ian N Moore
*Assistant Examiner* — Lakeram Jangbahadur
(74) *Attorney, Agent, or Firm* — Morgan, Lewis & Bockius LLP

(57) ABSTRACT

The present invention relates to a wireless communication system, More specifically, the present invention relates to a method and an apparatus for direct communication between terminals. The method for performing communication between terminals using a first terminal in a wireless communication system comprises the steps of: transmitting request information for communication between terminals to a base station; receiving, from the base station, control information necessary for setting a link for communication between the terminals after transmitting the request information; setting a direct link between the terminals for data flow between the first and second terminals using the control information; and the first and second terminals performing communication for data transmission using the direct link between the terminals when the control information is not transmitted from the base station.

4 Claims, 13 Drawing Sheets

(56) References Cited

U.S. PATENT DOCUMENTS

| | | | |
|---|---|---|---|
| 2006/0258383 A1* | 11/2006 | Jiang et al. | 455/502 |
| 2007/0060132 A1* | 3/2007 | Wilhelmsson et al. | 455/445 |
| 2007/0086424 A1* | 4/2007 | Calcev et al. | 370/350 |
| 2009/0016232 A1* | 1/2009 | Kwon et al. | 370/252 |
| 2009/0016456 A1* | 1/2009 | Li et al. | 375/260 |
| 2009/0017807 A1* | 1/2009 | Kwon et al. | 455/416 |
| 2009/0017843 A1* | 1/2009 | Laroia et al. | 455/458 |
| 2009/0017855 A1* | 1/2009 | Kwon et al. | 455/509 |
| 2009/0232095 A1* | 9/2009 | Ahn et al. | 370/331 |
| 2009/0286541 A1* | 11/2009 | Maheshwari et al. | 455/436 |
| 2009/0323659 A1* | 12/2009 | Zhang | 370/338 |
| 2010/0014463 A1* | 1/2010 | Nagai et al. | 370/328 |
| 2010/0067412 A1* | 3/2010 | Kitazoe et al. | 370/294 |
| 2010/0118834 A1* | 5/2010 | Kalhan | 370/336 |
| 2011/0044188 A1* | 2/2011 | Luo et al. | 370/252 |
| 2011/0182280 A1* | 7/2011 | Charbit et al. | 370/350 |
| 2012/0014334 A1* | 1/2012 | Oh et al. | 370/329 |
| 2013/0039324 A1* | 2/2013 | Kwon et al. | 370/329 |
| 2013/0142035 A1* | 6/2013 | Sunderrajan | 370/225 |
| 2013/0315100 A1* | 11/2013 | Li et al. | 370/254 |
| 2014/0126455 A1* | 5/2014 | Li et al. | 370/312 |

* cited by examiner

DIRECT COMMUNICATION BETWEEN DEVICES

TECHNICAL FIELD

The present invention relates to a wireless communication system, and more particularly, to a method and apparatus for direct communication between devices.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE OF THE INVENTION

Technical Tasks

Accordingly, one object of the present invention is to provide a method and apparatus for efficiently performing direct communication between devices in a wireless communication system.

Technical tasks obtainable from the present invention are non-limited the above-mentioned technical task. And, other unmentioned technical tasks can be clearly understood from the following description by those having ordinary skill in the technical field to which the present invention pertains.

Technical Solutions

To achieve these and other advantages and in accordance with the purpose of the present invention, as embodied and broadly described, a method for a first user equipment to perform a UE-to-UE (user equipment-to-user equipment) communication in a wireless communication system according to one embodiment of the present invention includes the steps of transmitting a request information for the UE-to-UE communication to a base station, receiving a control information required for establishing a link for the UE-to-UE communication from the base station after transmitting the request information, establishing a UE-to-UE direct link for a data flow between the first user equipment and a second user equipment using the control information, and performing a communication for a data transmission between the first user equipment and the second user equipment using the UE-to-UE direct link under no control of the base station.

To further achieve these and other advantages and in accordance with the purpose of the present invention, a first user equipment, which is configured to perform a UE-to-UE (user equipment-to-user equipment) communication in a wireless communication system, according to another embodiment of the present invention includes a radio frequency (RF) unit and a processor configured to transmit a request information for the UE-to-UE communication to a base station, the processor configured to receive a control information required for establishing a link for the UE-to-UE communication from the base station after transmitting the request information, the processor configured to establish a UE-to-UE direct link for a data flow between the first user equipment and a second user equipment using the control information, the processor configured to perform a communication for a data transmission between the first user equipment and the second user equipment using the UE-to-UE direct link under no control of the base station.

Preferably, the control information from the base station is received by the second user equipment as well.

Preferably, the request information includes an identification information on the second user equipment.

Preferably, the UE-to-UE direct link establishing includes transmitting a sync channel for the UE-to-UE direct link from the first user equipment.

Preferably, the present invention further includes receiving a preamble for a random access from the second user equipment and transmitting a response message including a transmission timing adjust command for the UE-to-UE direct link to the second user equipment after receiving the preamble.

Preferably, the first user equipment transmits data to the second user equipment using a downlink signal structure.

Preferably, the first user equipment and the second user equipment perform a direct communication using a frequency resource for a cellular network. Preferably, the first user equipment and the base station communicate with each other using a frequency resource for a cellular network and the first user equipment and the second user equipment directly communicate with each other using an ISM (industrial, scientific and medical) band.

Advantageous Effects

According to the present invention, direct communication between devices in a wireless communication system can be efficiently performed.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 7 is a diagram for one example that a relay node relays data traffics for two user equipments in-between.

MODE FOR INVENTION

First of all, the following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in DL and SC-FDMA in UL.

For clarity, some parts of the following description mainly concern specific communication technologies (e.g., 3GPP, IEEE 802.16, etc.), by which the technical idea of the present invention may be non-limited. Moreover, in the following description, specific terminologies are provided to help the understanding of the present invention. And, the use of the specific terminology can be modified into another form within the scope of the technical idea of the present invention.

In a wireless communication system, a user equipment may be able to receive information in downlink (DL) from a base station and may be also able to transmit information in uplink (UL). Informations transmitted/received by a user equipment may include data and various kinds of control informations and various kinds of physical channels may exist in accordance with types and usages of the informations transmitted/received by the user equipment.

Figure 1:
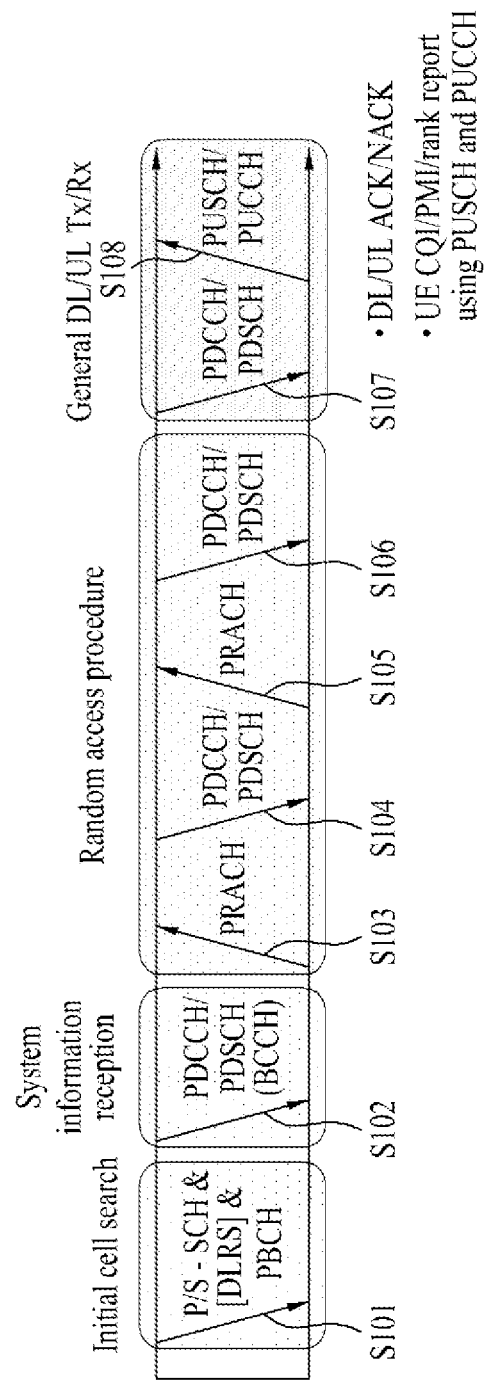
FIG. 1 is a diagram for one example of physical channels and a general signal transmitting method using the physical channels.

FIG. 1 is a diagram for explaining physical channels used for 3GPP system, which is one example of a wireless communication system, and a general signal transmitting method using the physical channels.

Referring to FIG. 1, after a power of a user equipment has been turned off, if the power of the user equipment is turned on again or the user equipment enters a new cell, the user equipment may perform an initial cell search job for matching synchronization with a base station and the like [S101]. To this end, the user equipment may receive a primary synchronization channel (P-SCH) and a secondary synchronization channel (S-SCH) from the base station, may match synchronization with the base station and may then obtain information such as a cell ID and the like. Subsequently, the user equipment may receive a physical broadcast channel (PBCH) from the base station and may be then able to obtain intra-cell broadcast information. Meanwhile, the user equipment may receive a downlink reference signal (DLRS) and may be then able to check a DL channel state.

Having completed the initial cell search, the user equipment may receive a physical downlink control channel (PDCCH) and a physical downlink shared control channel (PDSCH) according to the physical downlink control channel (PDCCH) and may be then able to obtain a detailed system information [S102].

On the other hand, the user equipment failing to complete an access to the base station may be able to perform a random access procedure to complete the access to the base station [S103 to S106]. To this end, the user equipment may transmit a specific sequence as a preamble via a physical random access channel (PRACH) [S103] and may be then able to receive a response message via PDCCH and a corresponding PDSCH in response to the random access [S104]. In case of a contention based random access except a case of handover, it may be able to perform a contention resolution procedure such as a transmission S105 of an additional physical random access channel and a channel reception S106 of a physical downlink control channel and a corresponding physical downlink shared channel.

Having performed the above mentioned procedures, the user equipment may be able to perform a PDCCH/PDSCH reception 5107 and a PUSCH/PUCCH (physical uplink shared channel/physical uplink control channel) transmission 5108 as a general uplink/downlink signal transmission procedure.

Figure 2:
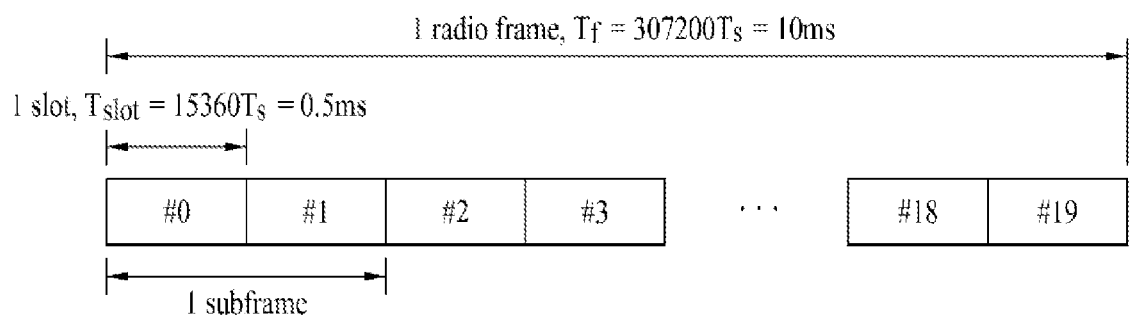
FIG. 2 is a diagram for one example of a structure of a radio frame of 3GPP system.

FIG. 2 is a diagram for one example of a structure of a radio frame used by 3GPP system.

Referring to FIG. 2, a radio frame has a length of 10 ms ($307,200 \cdot T_s$) and is constructed with 10 subframes in equal size. Each of the subframes has a length of 1 ms and is constructed with two slots. Each of the slots has a length of 0.5 ms ($15,360 \cdot T_s$). In this case, $T_s$ indicates a sampling time and is expressed as $T_s = 1/(15 \text{ kHz} \times 2,048) = 3.2552 \times 10^{-8}$ (about 33 ns). The slot includes a plurality of OFDM symbols or SC-FDMA symbols in a time domain and also includes a plurality of resource blocks (RBs) in a frequency domain. In the 3GPP system, one resource block (RB) includes '12 subcarriers×7 or 6 OFDM or SC-FDMA symbols'. A transmission time interval (hereinafter abbreviated TTI), which is a unit time for transmitting data, can be determined as at least one subframe unit. The above-described structure of the radio frame is just exemplary. And, the number of subframes, the number of subslots, or the number of OFDM or SC-FDMA symbols included in a radio frame may be modified in various ways.

Figure 3:
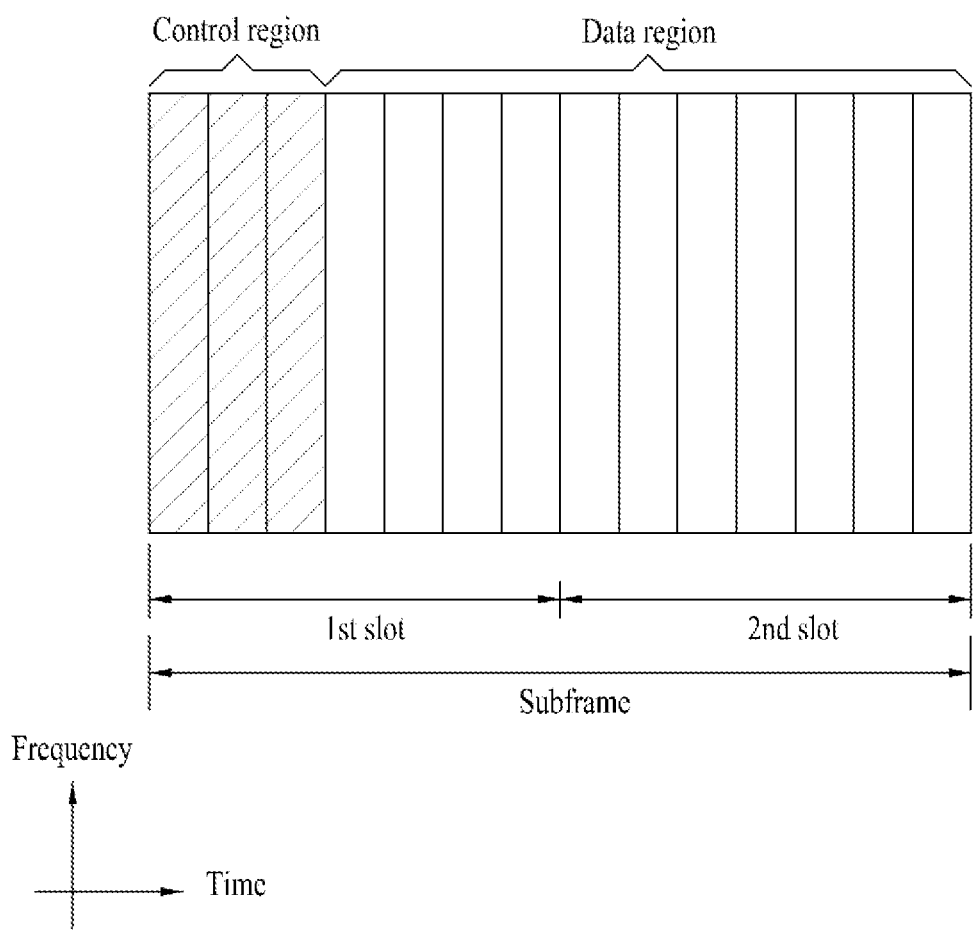
FIG. 3 is a diagram for a structure of a downlink (hereinafter abbreviated DL) subframe.

FIG. 3 is a diagram for a structure of a DL subframe used in 3GPP system.

Referring to FIG. 3, at least one or more OFDM symbols situated at a head part of a subframe are used as a control region and the rest of OFDM symbols are used as a data region. A size of the control region may be set for each frame independently. The control region is used to transmit scheduling information and other L1/L2 (layer 1/layer 2) control information. And, the data region is used to transmit traffics. Control channels may include PCFICH (Physical Control Format Indicator Channel), PHICH (Physical hybrid automatic repeat request (ARQ) indicator Channel), PDCCH (Physical Downlink Control Channel) and the like. And, traffic channels include PDSCH (physical downlink shared channel).

The PDCCH informs each user equipment or a user equipment group of information related to resource allocation of PCH (paging channel) and DL-SCH (downlink-shared channel), uplink scheduling grant, HARQ information and the like. The PCH (paging channel) and the DL-SCH (downlink-shared channel) are transmitted on the PDSCH. Hence, a base station or user equipment generally transmits/receives data on the PDSCH except specific control information or specific service data. Control information transmitted on the PDCCH is called downlink control information (DCI). The DCI indicates uplink resource allocation information, downlink resource allocation information, uplink transmit power control command for random user equipment groups and the like. A base station determines a PDCCH format in accordance with DCI to transmit to a user equipment and attaches CRC (cyclic redundancy check) to control information. In this case, the CRC is masked with a unique identifier (e.g., RNTI (radio network temporary identifier) in accordance with an owner or usage of the PDCCH.

Figure 4:
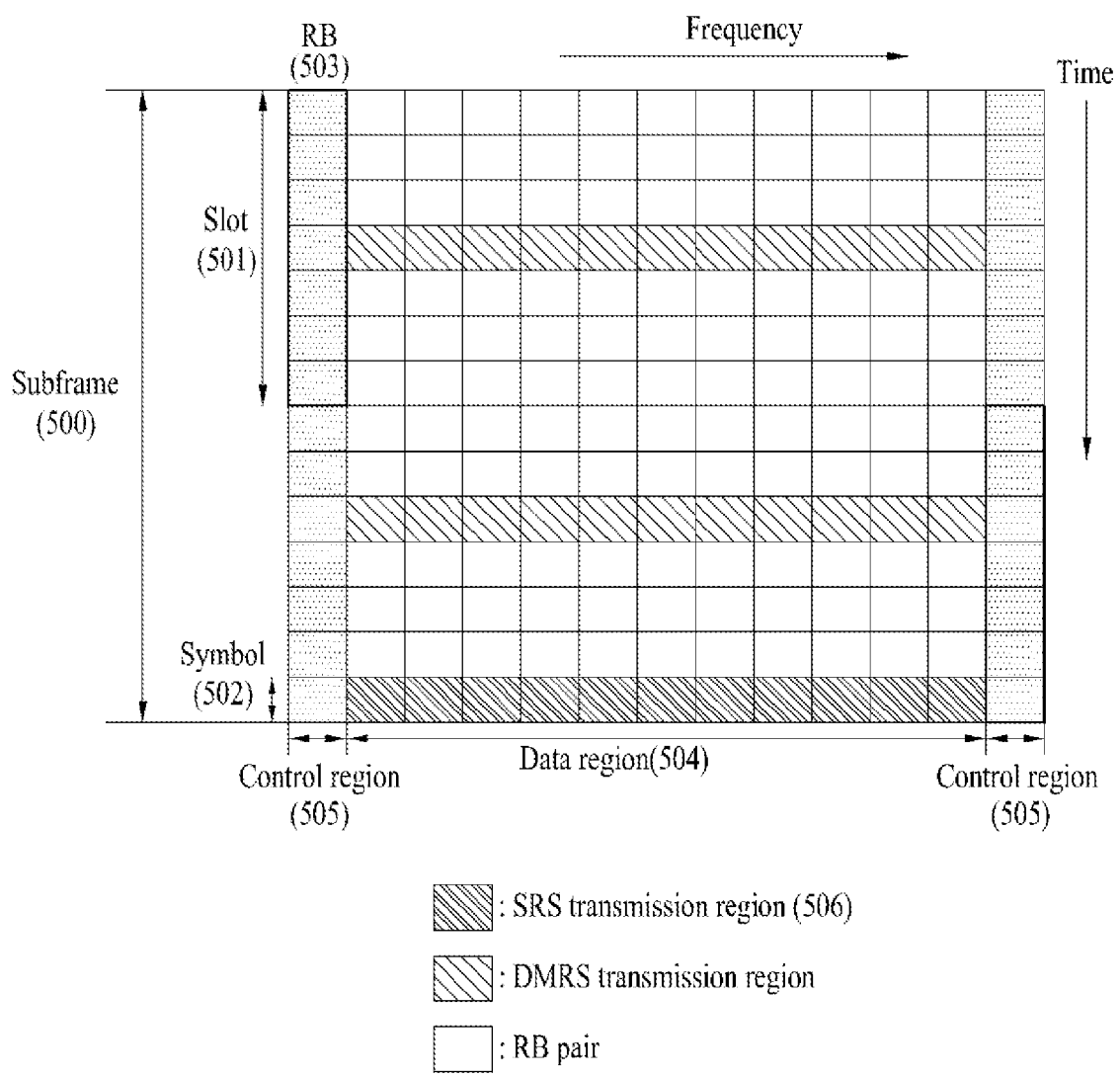
FIG. 4 is a diagram for one example of a structure of an uplink (hereinafter abbreviated UL) subframe used in a system.

FIG. 4 shows one example of a structure of an uplink (hereinafter abbreviated UL) subframe used in a system.

Referring to FIG. 4, a subframe 500 includes a pair of 0.5 ms slots 501. Assuming a length of a normal CP (cyclic prefix), each of the slots includes 7 symbols 502 and each of the symbols corresponds to a single SC-FDMA symbol. A resource block (RB) 503 is a resource allocation unit. In particular, the resource allocation unit corresponds to 12 subcarriers in frequency domain and also corresponds to a single slot in time domain. A structure of an uplink subframe of LTE is mainly divided into a data region 504 and a control region 505. The data region means a communication resource used to transmit such data transmitted to each user equipment as voice, packets and the like and includes PUSCH (physical uplink shared channel). The control region means a communication resource used to transmit a UL control signal (e.g., a DL channel quality report from each user equipment, reception ACK/NACK for a DL signal, a UL scheduling request, etc.) and includes PUCCH (physical uplink control channel). A sounding reference signal (SRS) is transmitted on SC-FDMA symbol situated last on a time axis of one subframe. Sounding reference signals (SRSs) of several user equipments, which are carried on last SC-FDMA of the same subframe, may be identifiable from each other in accordance with frequency position/sequence.

Figure 5:
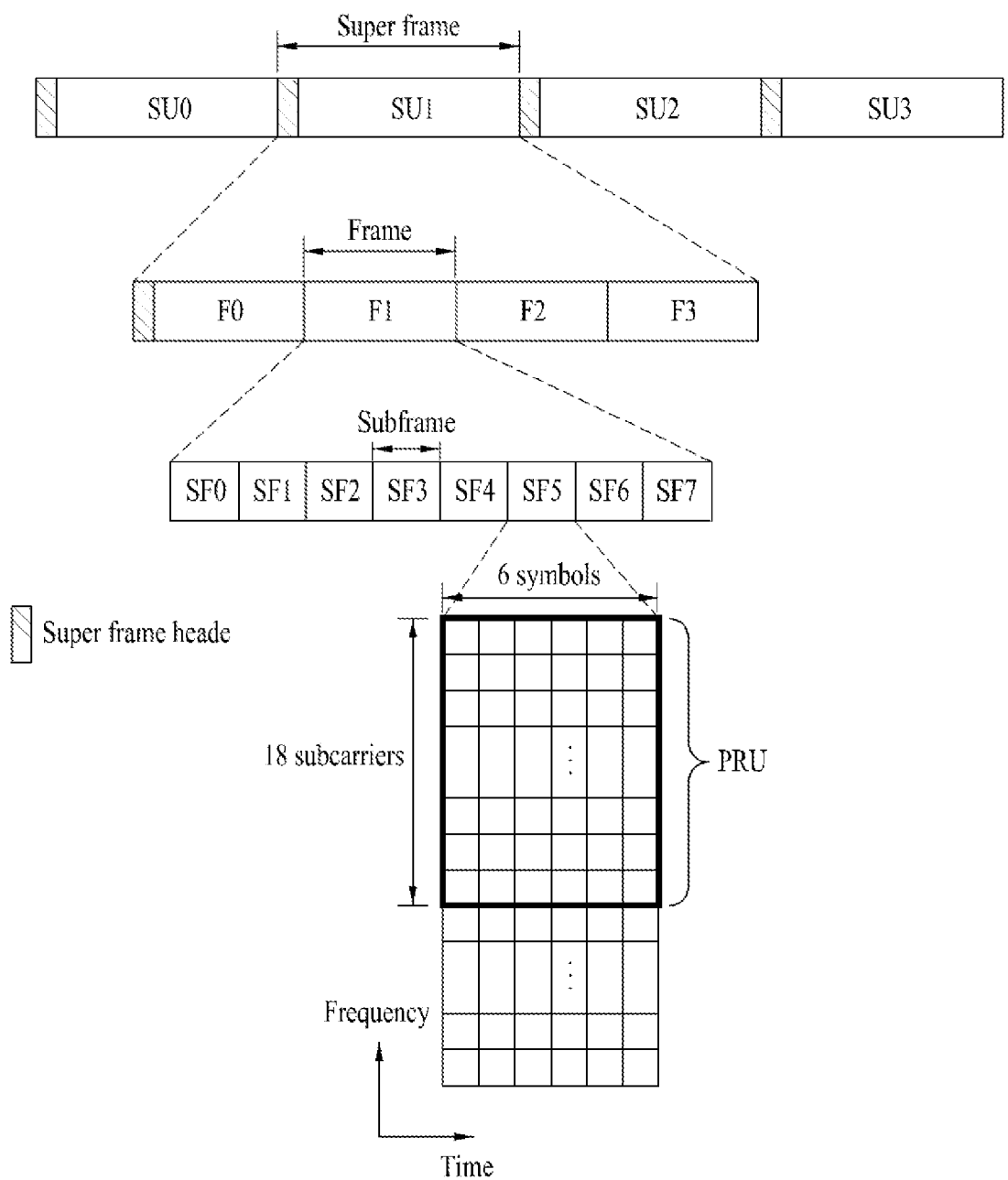
FIG. 5 is a diagram for one example of a radio frame structure of IEEE 802.16m system.

FIG. 5 shows one example of a radio frame structure of IEEE 802.16m system. A radio frame structure may be applicable to FDD (frequency division duplex), H-FDD (half frequency division duplex), TDD (time division duplex) and the like.

Referring to FIG. 5, a radio frame structure includes 20-ms super frames SU0 to SU3 each of which is supportive of a bandwidth of 5 MHz, 8.75 MHz, 10 MHz or 20 MHz. The super frame includes 4 5-ms frames F0 to F4 equal to each other in size and starts with a super frame header (SFH). The super frame header carries essential system parameters and system configuration information. The super frame header may be situated in a $1^{st}$ subframe. The super frame header may be classified into P-SFH (primary-SFH) and S-SFH (secondary-SFH). And, the super frame header may include a broadcast channel.

A frame includes 8 subframes SF0 to SF7. Each of the subframes is assigned to DL or UL transmission. The subframe includes a plurality of OFDM symbols in time domain and a plurality of subcarriers in frequency domain. The number of the OFDM symbols included in the subframe may be variously changeable depending on a channel bandwidth, a CP length or the like.

The subframe includes a plurality of physical resource units (PRUs) in frequency domain. The PRU is a basic unit for resource allocation and is constructed with a plurality of contiguous OFDM symbols in time domain and a plurality of contiguous subcarriers in frequency domain. For instance, the number of OFDM symbols in PRU may be equal to that of OFDM symbols included in a subframe. Hence, the number of the OFDM symbols in the PRU may be determined in accordance with a type of the subframe. Meanwhile, if the number of the subframes in the PRU may be set to 18. In this case, the PRU may include 6 OFDM symbols×18 subframes. The PRU may be called a distributed resource unit (DRU) or a contiguous resource unit (CRU).

Figure 6:
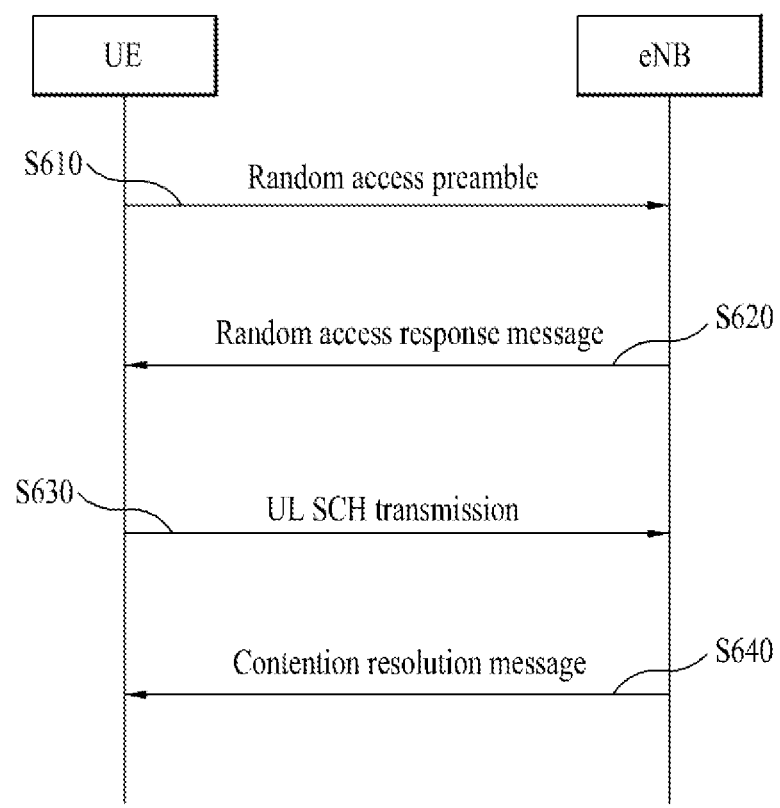
FIG. 6 shows a random access procedure.

FIG. 6 shows a random access procedure.

First of all, a random access procedure is used to transmit data having a short length. For instance, the random access procedure may be performed in case of an initial access in RRC_IDLE, an initial access after radio link failure, a handover in need of a random access procedure, or an occurrence of UL/DL data in need of a random access procedure in RRC_Connected. Such an RRC message as an RRC connection request message, a cell update message, a URA update message and the like is transmitted using a random access procedure. Such a logical channel as CCH (common control channel), DCCH (dedicated control channel) and DTCH (dedicated traffic channel) may be mapped to such a transport channel as RACH. The transport channel RACH is mapped to a physical channel PRACH (physical random access channel). If a MAC layer of a user equipment instructs a PRACH transmission to a user equipment physical layer, the user equipment physical layer selects a single access slot and a single signature in the first place and may then transmits a PRACH preamble in uplink. The random access procedure is classified into a contention based procedure and a non-contention based procedure.

Referring to FIG. 6, a user equipment receives information on a random access via system information from a base station and then saves the received information. Thereafter, if a random access is required, the user equipment transmits a random access preamble (hereinafter named a message 1) to the base station [S610]. If the base station receives the random access preamble from the user equipment, the base station transmits a random access response message (hereinafter named a message 2) to the user equipment [S620]. In particular, DL scheduling information for the random access response message may be transmitted on L1/L2 control channel (PDCCH) by being CRC masked with RA-RNTI (random access-RNTI). Having received the RA-RNTI masked DL scheduling signal, the user equipment receives the random access response message on PDSCH and may be then able to decode the received random access response message. Subsequently, the user equipment checks whether random access response information instructed to the user equipment exists in the random access response message. In particular, 'whether random access response information instructed to the user equipment exists in the random access response message' may be checked depending on whether RAID (random access preamble ID) for the preamble having been transmitted by the user equipment exists. The random access response information may include a timing advance (TA) indicating a timing offset information for synchronization, a radio resource allocation information on the radio resource used in UL, a temporary identifier (e.g., temporary cell RNTI, T-CRNTI, etc.) for user equipment identification and the like.

If the user equipment receives the random access response information, the user equipment transmits a UL message (hereinafter named a message 3) on UL SCH (shared channel) in accordance with the radio resource allocation information included in the response information [S630]. Having received the UL message from the user equipment, the base station transmits a contention resolution message (hereinafter named a message 4) to the user equipment [S640].

Meanwhile, a ranging procedure in IEEE 802.16 system is used for various purposes. In particular, the ranging procedure is used for 4 kinds of usages including an initial ranging, a handover ranging, a periodic ranging and a bandwidth request ranging. In more particular, the initial ranging is used to match UL timing synchronization (i.e., time synchronization, frequency synchronization) in case that a user equipment attempts an initial network entry. The handover ranging is used to match an initial synchronization for a target base station if an access target is changed into the target base station from a source base station. The periodic ranging is used for a user equipment to update UL synchronization periodically. And, the bandwidth request ranging is used for a user equipment to make a request for a UL resource to a base station.

Short range communication is described as follows. In short range communication, communication between user equipments generally has peer-to-peer or peer-to-multipoint configuration. A communication medium and control flow between user equipments are managed by a source device or a destination device, which becomes a communication entity. Communication entities mutually perform communication by the protocol according to a random access system defined in-between. And, it may be unnecessary to consider whether one of the communication entities is actually connected to a public internet network.

Meanwhile, communication on a cellular network should be defined between a base station and a user equipment or between a base station and an equivalent existence only and all communication activities are controlled by the base station or an existence equivalent to the base station. In accordance with such a protocol, the cellar network restricts operations of all user equipments by predetermined rules to have a structure capable of obtaining maximum throughput. On the other hand, these rules may have the over-ruled aspect in accordance with an application or a channel environment of a user equipment. For instance, a base station makes a decision of power to be consumed for a user equipment to transmit data traffic and controls all operations for the user equipment to transmit the data traffic, whereby short range communication between user equipments should operate in a manner that the base station is placed in-between. In order to realize short range communication with low power consumption, a user equipment utilizes a separate radio access technology (RAT) or may have to accept the inconvenience of the cellular network.

For instance, if a user equipment intends to communication with a user equipment located nearby by utilizing RAT of a cellular only instead of using a separate RAT for short range communication, the corresponding data exchange is regulated by a base station. Yet, the cellular RAT is accompanied by an irrational communication structure in which the corresponding data should be delivered to a base station and then retransmitted to a destination user equipment despite that user equipments are located physically closest to each other.

Although communication between a user equipment and a user equipment is not allowed in a cellular network, the cellular network supports an existence or structure similar to the cellular network. For instance, a user equipment accesses a useful relay node located nearby and is then able to transmit/receive data, instead of performing direct communication with a base station. In this case, it is advantageous in obtaining spectrum efficiency with power less than that required for the user equipment to deliver data to the base station in direct. Yet, the relay node is not a user equipment but plays a role as an access point for connection to a network only. Hence, in case that one user equipment intends to transmit data to another user equipment located nearby by itself, the user equipments are still burdened because they have to establish a data flow to a relay node or a base station. In particular, even if power consumption may be controllable through the relay node to some extent, it may be difficult to absolutely utilize the relay node for the communication between the user equipments.

Figure 7:
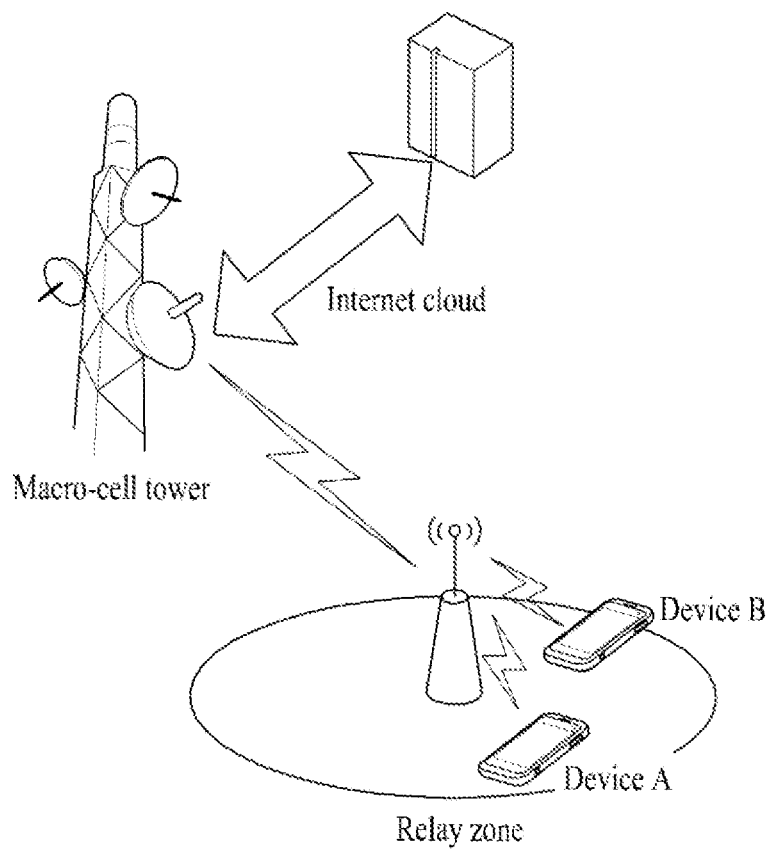

FIG. 7 is a diagram for one example that a relay node relays data traffics for two user equipments in-between.

Referring to FIG. 7, assume that a user equipment (i.e., a device A) transmits data traffic to a relay node and that the relay node retransmits the data traffic to a user equipment (i.e., a device B) existing in a relay zone by local forwarding. In this case, the user equipment should match a power of the data traffic to a power level corresponding to a pathloss of a path to the relay node and the relay node should transmit the data traffic with the power enough to overcome the corresponding pathloss in order to deliver the data traffic to the user equipment that finally becomes an end point of the data traffic. Since this power level works as interference on another user equipment located nearby, a frequency resource used for the data traffic transmission may be barely usable by the nearby user equipment.

Formula 1 indicates a pathloss model used by Bluetooth. Referring to Formula 1, a pathloss exponentially increases in accordance with a distance.

$$PathLoss = 20 \log(4*pi*r/lambda) \text{ for } r <= 8 \text{ m}$$

$$PathLoss = 58.3 + 33 \log(r/8) \text{ for } r > 8 \quad \text{[Formula 1]}$$

In Formula 1, 'r' indicates a distance (unit: meter) and 'lamda' indicates a weight.

Figure 8:
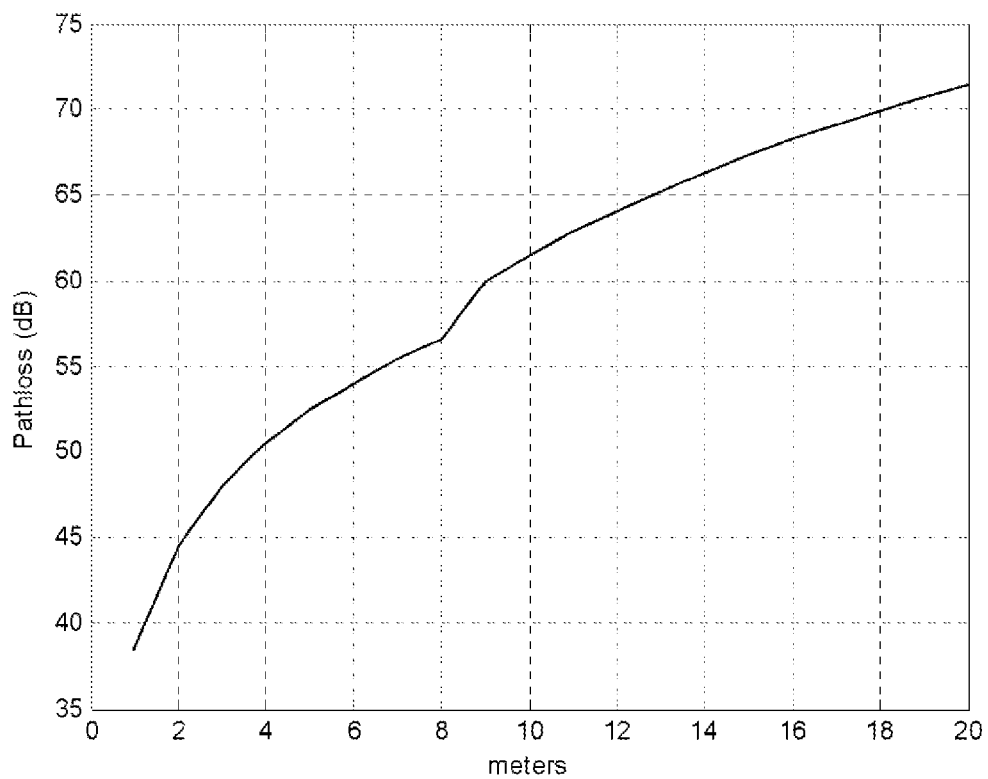
FIG. 8 is a diagram for one example of a path loss in accordance with a distance.

FIG. 8 is a diagram for one example of a path loss in accordance with a distance.

Referring to FIG. 8, assume that a distance between a user equipment A and a user equipment B is 2 meters and that a distance between the user equipment A and a relay node is 20 meters, a transmit power consumed by the user equipment A has a difference equal to or greater than 25 dB. In particular, it can be observed that an energy amount used for the user equipment A to transmit data to the user equipment B is greater than about 300 times. This means that the user equipment A or B needs to consume the power considerably more than that required for the direct communication in order to perform a transmission via the relay node, thereby indicating an inefficient energy consumption pattern. In case that a battery replacement of such a battery based user equipment as an M2M (machine-to-machine) device is not facilitated, it may cause a serious difference.

Meanwhile, if a user equipment has a separate short range communication RAT for direct communication on a cellular network, two RATs need to be simultaneously activated to prepare for the case of an approach to the cellular network and the case of an approach to a local user equipment. This structure is unable to save power and includes multiple RATs all, whereby a chip size increases and multiple RF and antenna structure is required. Hence, complexity eventually increases.

Thus, it is apparent that this structure is not more advantageous than a structure capable of handling short range with a single RAT.

Embodiment

As mentioned in the foregoing description, the structural problem of a cellular network is a channel environment vulnerable to a network access. Hence, a user equipment may be restricted from using an optimal communication path by finding and accessing a new access path. In order to solve this problem, the following method may be taken into consideration. For instance, when a prescribed user equipment is located in a shadow region, if a nearby user equipment has good status of a channel to a base station, the prescribed user equipment communicates with the nearby user equipment and the user equipment having the corresponding good channel communicates with the base station, thereby improving power efficiency and throughput of the user equipment that becomes a source of data traffic.

Therefore, such an operation as a data delivery between user equipments in a cellular network may be preferably performed by direct communication between the user equipments. More preferably, the operation may be performed by single RAT. And, it may be preferable that the amount of communication between a user equipment and a base station/relay node is minimized.

In the following description, various aspects to support communication between user equipments are proposed. In particular, the present invention proposes the mechanism of PHY (physical) and MAC (medium access control) to enable communication between user equipments. The present invention enables communication between user equipments such as M2M (machine to machine) devices and human devices, thereby usable in reducing total power to be consumed by a user equipment, minimizing unnecessary data traffic migration, minimizing a physical moving path of data traffic, or improving throughput of a network. The present invention may have a configuration capable of allowing a range between a minimum change and a change at a predetermined level in consideration of legacy systems. And, communication between user equipments may be implemented in a manner of being defined under the control of a base station.

Figure 9:
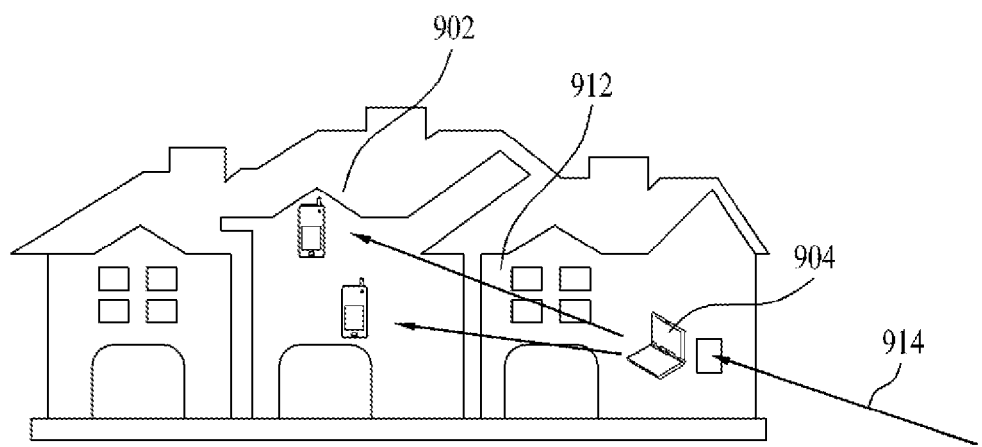
FIG. 9 and FIG. 10 are diagrams for examples of direct communication between user equipments according to the present invention.
Figure 10:
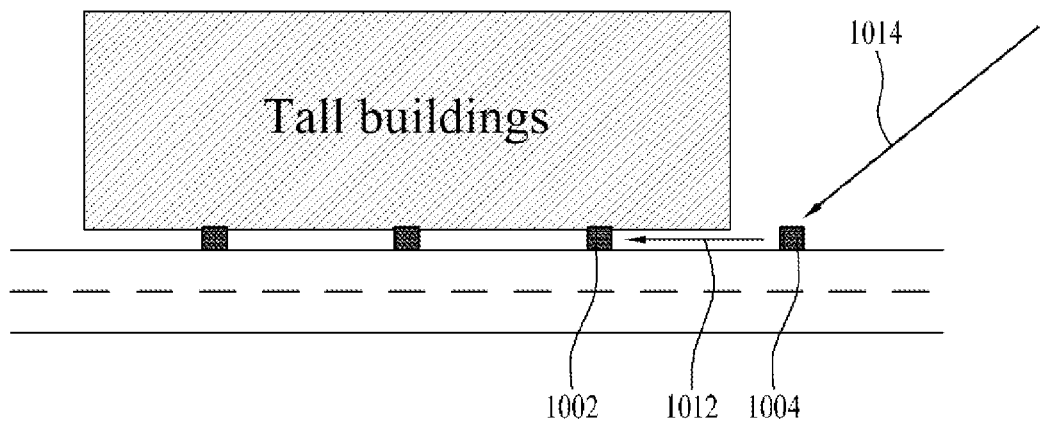

FIG. 9 and FIG. 10 are diagrams for examples of direct communication between user equipments according to the present invention. According to the present examples, a user equipment plays a role as a relay node in the direct communication between user equipments. In particular, the user equipment works as a mobile relay node.

Referring to FIG. 9, a user equipment 902 at home is able to access a network via another device 904. To this end, a link 912 for direct communication is established between the user equipment 902 and the device 904. The device 904 establishes a link 914 with a network and then supports an information flow between the user equipment 902 and the network.

Referring to FIG. 10, a user equipment 1002 in a show region in accordance with a peripheral environment such as a tall building is able to access a network using direction communication with another user equipment 1004. to this end, a link 1012 for direct communication is established between the user equipment 1002 and the user equipment 1004. The user equipment 1004 outside the shadow region establishes a link 1014 with a network and then supports an information flow between the user equipment 902 in the shadow region and the network.

Figure 11:
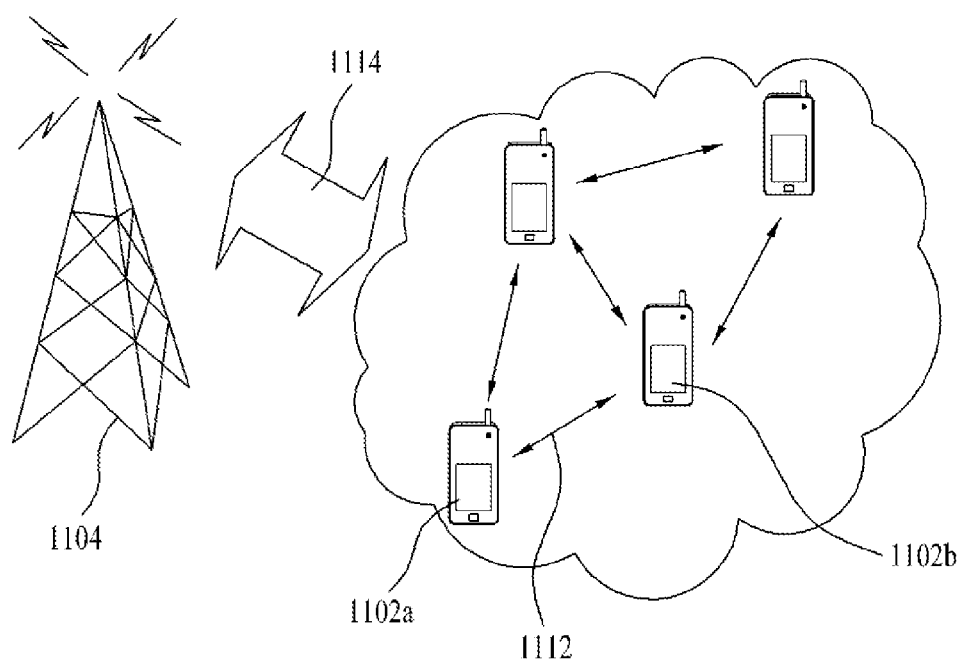
FIG. 11 is a diagram for another example of direct communication between user equipments according to the present invention.

FIG. 11 is a diagram for another example of direct communication between user equipments according to the present invention. For example, according to the present embodiment, as communication between user equipment is allowed, unnecessary data are not delivered to a base station. For instance, it may be able to consider a cast that audio/video/text information is transmitted and received between user equipments located in proximity region, a case that user equipments subscribed to SNS (social network service) recognize user equipments located in the proximity region based on a location based service and then transmit/receive informations, a case that a game is linked between user equipments, and the like.

Referring to FIG. 11, a base station transmits information for direct communication between user equipments [1114] and user equipments 1102a, 1102b . . . transmit and receive informations by the direct communication [1112]. The information transmission and reception between the base station 1104 and the user equipments 1102a, 1102b . . . may be limited to control information. For instance, the control information provided by the base station 1104 may include information on configuring a link for direct communication, information related to a configuration/use of a resource for direct communication and the like. The information transmission and reception between the base station 1104 and the user equipments 1102a, 1102b . . . may be performed via a specific one of the user equipments 1102a, 1102b . . . . Once the link for the direction communication between user equipments is established, information can be directly transmitted and received between the user equipments 1102a, 1102b . . . in the absence of control from a base station.

Figure 12:
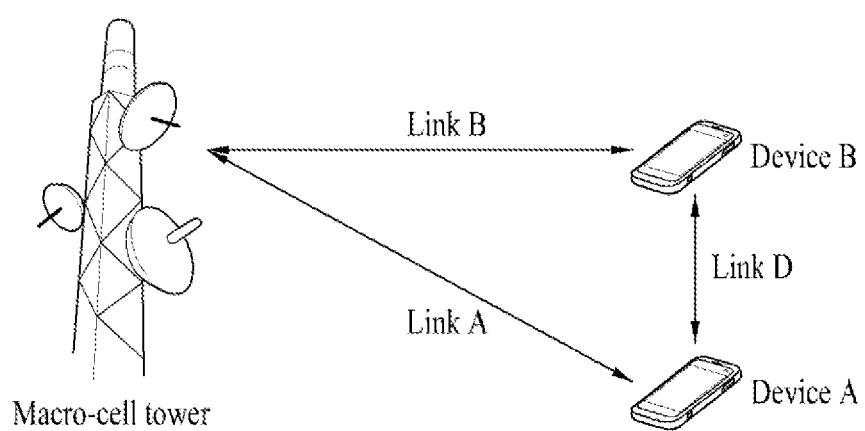
FIG. 12 is a diagram for one example of direct communication between user equipments in accordance with a link state according to the present invention.

FIG. 12 is a diagram for one example of direct communication between user equipments in accordance with a link state according to the present invention. In the drawing, a link A is a communication link between a device A (assumed as a source user equipment) and a base station, a link B is a communication link between a device B (assumed as a destination user equipment) and the base station, and a link D is a communication link between the source device and the destination device.

Referring to FIG. 12, each of the link A and the link B maintains a state of providing a channel quality enough for a corresponding user equipment to communicate with the base station in a normal communication environment. Yet, it may frequently happen that a quality of the link between the source user equipment and the base station a quality of the link between the destination user equipment and the base station is not good. Therefore, the settings for direct communication between user equipments need to be different in accordance with a state of each of the link A, the link B and the link D.

Case A: Good Link A and Good Link B

A base station is in a state capable of directly accessing a source user equipment or a destination user equipment. And, each of the user equipments is in a state capable of all controls and data communications via the base station. In the above states, if direct communication between user equipments is performed, establishment of a communication channel between the two user equipments, actual traffic transmissions between the two user equipments and the like can be instructed to each of the user equipments by the base station. For instance, if the source user equipment intends to establish a direct communication connection to the destination user equipment, the source user equipment may be able to inform the base station of information (e.g., such information for indicating the corresponding user equipment uniquely and simply as an IP (internet protocol) address, a phone number, etc.) on the destination user equipment. In particular, the information (e.g., a phone number, an SNS ID, etc.) on the destination user equipment may be previously saved in the source user equipment, the information on the destination user equipment may be provided by a network (e.g., the information (e.g., a list) on the destination user equipment is received from the network based on a location based service), or the information on the destination user equipment may be directly acquired by a scan process or the like. In this case, the base station may be able to instruct the destination user equipment to be configured to receive the direct communication. Subsequently, in order to actually active the link D, synchronization for the communication link between the user equipments and configuration information on the user equipments need to be confirmed. Thereafter, the direct communication between the user equipments is enabled. According to the present example, the base station may be able to perform detailed controls (e.g., link D configuration, scheduling for the link D, etc.) for the direct communication between the user equipments on each of the user equipments. For instance, the base station may be able to inform each of the user equipments of the following informations: a resource for the link D configuration; a data traffic transmission entity; a data traffic transmission resource; a data traffic content, an MCS (modulation and coding scheme); a transmit power level; and the like.

Case B: Good Link A and Poor Link B

A source user equipment is facilitated to receive a signal (e.g., a control signal) from a base station. Yet, a destination user equipment is not facilitated to receive a signal (e.g., a control signal) from the base station. In this case, the source user equipment accepts a control role played by the base station and the destination user equipment may be then able to receive the control signal transmitted by the source user equipment. Regarding a procedure thereof, the source user equipment informs the base station that the source user equipment is going to perform direct communication and may be then able to deliver information on the destination user equipment to the base station. In case that the base station has difficulty in controlling the destination user equipment or consumes considerable amount of power, the base station may be able to set the destination user equipment to be directly controlled by the source user equipment. Since the base station may not possibly know the state of the destination user equipment, some or all information on the destination user equipment may be delivered to the base station from the source user equipment.

If the base station allows the direct communication to the source user equipment, the base station allocates a basic resource for the source user equipment to access the destination user equipment. Subsequently, the source user equipment may be able to perform a job for connection to the destination user equipment using the corresponding resource. If the destination user equipment is not managed by the base station, an autonomous connection is not available. Hence, the destination user equipment should be configured to receive the control information transmitted by the source user equipment or the source user equipment should be configured to transmit the control information receivable by the destination user equipment. To this end, a user (e.g., a person) may be able to perform an additional operation. After the destination user equipment has received the control information transmitted by the source user equipment, if a link/resource for the direct communication is configured, both of the user equipments should exchange data and control signals on the resource region allowed by the source user equipment only. Moreover, the setting of the transmit power level or the like may be controlled by the source user equipment. The source user equipment may receive all configurations of the resources usable for the direct communication from the base station. The source user equipment may be able to deliver/receive a structure and transmission mode for data communication within the corresponding resource, a transmit power, an amount of transmitted data and the like to/from the base station.

Case C-1: Poor Link A and Good Link B

A source user equipment is facilitated to receive a signal (e.g., a control signal) from a base station. And, a destination user equipment is not facilitated to receive a signal (e.g., a control signal) from the base station. In case that a connection between the source user equipment and the base station is unstable or inappropriate, the coordination for direct communication should be performed by the destination user equipment as well as the setting of the relation to the base station. In order for the source user equipment to be connected to the destination user equipment, the source user equipment should be able to search for the destination user equipment. Alternatively, a user directly sets the destination user equipment to enter a direct communication mode, necessary configuration is received from the base station, and an environment for the direct communication can be then established. In particular, if human interactions are involved to connect the source user equipment and the destination user equipment to each other, if the destination user equipment is to set to the direct communication mode, the destination user equipment may be able to inform the base station of the intention for the direct communication. Hence, the base station allows the direct communication to the destination user equipment, allocates a resource actually available for the direct communication, and may be able to deliver necessary configuration information (e.g., signal system, transmission format, power level, etc.). Based on this information, the destination user equipment should transmit a signal to enable the source user equipment to search for and access the destination user equipment. In doing so, since the source user equipment is not aware of the system structure or the resource structure at all, the user equipment attempting the direct communication may be able to use an operating method similar to an initial access used by the general cellular. For instance, referring now to FIG. 1, the destination user equipment may be able to deliver such information as a sync channel for catching a timing, a random access resource, system configuration information for an access to a resource and the like to the source user equipment. Thereafter, the source user equipment may be able to access the destination user equipment based on this information. In doing so, the base station may be able to provide overall resource use model via the destination user equipment. For instance, the base station may be able to set up a flow and transmission format of data traffic for the direct communication, a power level and the like via the destination user equipment.

Case C-2: Good Link A and Good link B

For another example, in case that a source user equipment attempts direct communication, the source user equipment may be able to transmit a direct communication request signal receivable by a destination user equipment to the destination user equipment. In particular, since a link between the source user equipment and a base station is not good, if the source user equipment is unable to directly receive a grant for the direct communication between user equipments from the base station, the source user equipment may be able to transmit a direct communication request signal in format receivable by a contender destination user equipment. Having received the direct communication request signal, the contender destination may be able to transmit ACK for the request to the source user equipment. In order to minimize the interference with neighbor user equipments, the direct communication request transmission from the source user equipment may progress in a manner of gradually raising a transmit power, which starts with a minimum reference power, until receiving ACK from at least one contender destination. Having received the ACK, the source user equipment enters a standby state for the direct communication. Having received the direct communication request signal, at least one contender destination user equipment may be able to transmit necessary information to the base station in correspondence to the received direct communication request signal. In consideration of the received information, the base station may be able to finally determine/designate an optimal user equipment as the destination user equipment among a plurality of the contender destination user equipments in aspects of various kinds of performances (e.g., data throughput, power efficiency, etc.). The selected destination user equipment delivers such information as a sync channel for catching a timing, a random access resource, system configuration information for an access to a resource for the direct communication and the like to the source user equipment. Based on this information, the source user equipment may be able to access the destination user equipment. In doing so, the base station provides an overall resource use model via the destination user equipment. And, the base station may be able to set up a flow and transmission format of data traffic for the direct communication, a power level and the like via the destination user equipment. The present example is applicable to a method for a source user equipment to communicate with a base station via an unspecific destination user equipment or a plurality of communication methods using an unspecific destination user equipment like client cooperation instead of a case that a source user equipment intends to communicate with a specific destination user equipment.

Case D: Poor Link A and Poor Link B

A base station control for performing direct communication between user equipment s is not allowed in aspect of a user equipment because there is no way for the user equipment to be connected to the base station. In this case, if the direct communication between user equipments is not supported, it may be preferable in aspect of using resources of a whole network. For instance, if a user equipment randomly uses a specific frequency band without coordination from a base station, the direct communication between user equipments may interfere with surroundings. Yet, it may be necessary for user equipments to perform the direct communication between user equipments in a specific situation (e.g., emergency, etc.) irrespective of a base station. Therefore, if a specific situation (e.g., an emergency) occurs, a source user equipment or a destination user equipment generates and transmits a signal for a user equipment search, a local system for the direct communication is configured in accordance with the signal, and the corresponding communication can be then performed. Since a frequency band used by a cellular network is not generally allowed to be randomly used, it is preferable that the direct communication is not performed if possible. Yet, if a frequency band is used in a manner of moving to a randomly available band like ISM (industrial, scientific and medical) band, the corresponding communication can be performed by generating a signal for the direct communication free from the cellular network.

As mentioned in the foregoing description, in case that a band (e.g., an unauthorized band like ISM band) different from a frequency used by a cellular network is used for a direct communication by a user equipment, the user equipment may be able to generate and transmit a signal for the direct communication without being restricted by a base station. Yet, it may be preferable that the user equipment is coordinated by the base station to some extent in order to lower a level of collision or interference with neighbor user equipments.

Figure 13:
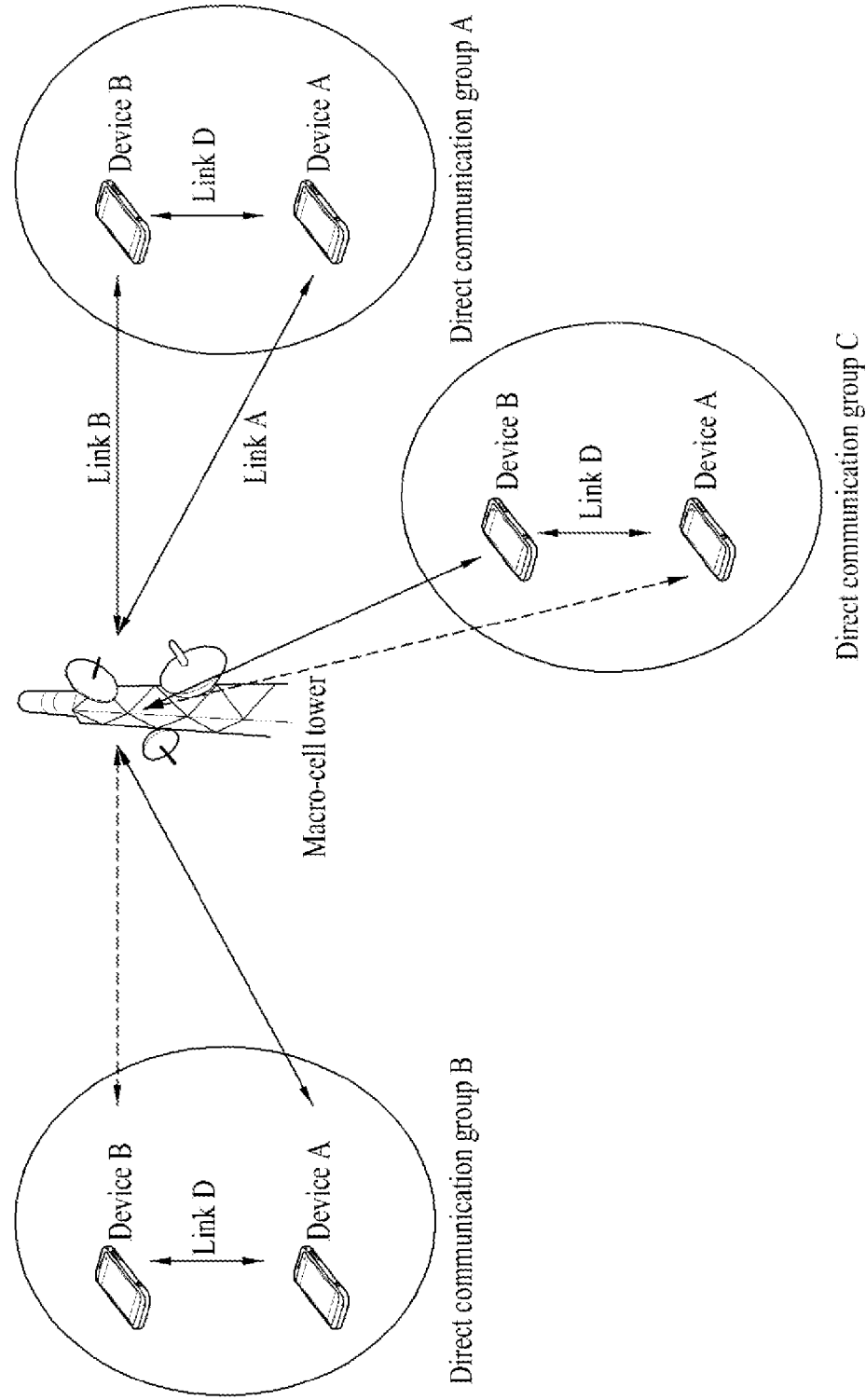
FIG. 13 is a diagram for one example that direct communication groups are set among a plurality of user equipments according to the present invention.

FIG. 12 shows the example of one local direct communication. Yet, a plurality of user equipment groups may actually exist to perform direct communication in a network and may use the same or different time/frequency resource. FIG. 13 is a diagram for one example that a plurality of direct communication groups are configured.

In aspect that a time/frequency resource for local direct communication is used in a physically limited region only, a resource for direct communication may be named a localized spectrum or spectrum localization. For instance, in case that a plurality of direct communication groups exist, one localized physical area (i.e., physical localization) can be configured in a manner that several user equipments perform direct communication with each other in a single cell. In doing so, if time/frequency resources for the direct communication overlap with each other, the physical localization should have a mutually disjointed form between the direct communication groups. On the other hand, if the time/frequency regions are different from each other, the physical localization between the groups, which perform the direct communication between user equipments, may be defined as a mutual overlapping structure.

Resource (hereinafter named a direct communication zone, for convenience) for direct communication may be allocated by a base station via a separate signaling per direct communication group. For instance, resource allocation information for a direct communication group (or a channel for the same) may be masked using a corresponding direct communication group ID. Meanwhile, when a common direct communication zone exists, if all or some of direct communication groups in a cell share the corresponding zone, time/frequency assignment information on the corresponding zone may be broadcasted as system information to all the direct communication groups or may be broadcasted or multicasted to the corresponding direct communication groups. In doing so, the resource allocation information for the common direct communication group (or a channel for the same) may be masked using a common ID. To this end, a temporary ID for decoding the resource allocation information on the common direct communication zone may be signaled to the corresponding direct communication group. Moreover, even if the common direct communication zone exists, the resource allocation information for the direct communication may be signaled per group. Signaling for the direct communication zone assignment may be able to exactly use a resource allocation format used for communication between user equipment and base station in order to minimize the influence on a previous system. A specific region may be fixed as a direct communication zone to use without signaling. All or some of a specific resource allocation region (e.g., MBS (multicast broadcast service) region) existing in a previous system may be reusable as a direct communication zone. In this case, the direct communication zone is preferably set in a manner of avoiding symbol/subframe for transmitting a DL signal (e.g., a super frame header, a preamble, etc.) that is preferably decoded by all user equipments all the time.

The common direct communication zone mentioned in the above description is identically used not only for the data communication after the configuration of the direct communication group but also for all data/control signal transmitting processes (e.g., network entry/reentry, bandwidth request/ scheduling request, measurement of sounding/midamble, CQI or ACK/NACK feedback, etc.) of the user equipments intending to perform the direct communication or the user equipments currently performing the direct communication.

Moreover, a link between a base station and a user equipment, which is established by the corresponding user equipment, in the direct communication may be non-limited by the structure in which the corresponding user equipment is connected to a single base station only. For instance, a source user equipment may be attached to a cell A and a destination user equipment may be attached to a cell B. In this case, each of the user equipments may be controlled by a corresponding base station. Alternatively, after a serving cell for one direct communication has been defined, the corresponding serving cell may be able to control the user equipment for the direct communication.

Neighbor Device Search Structure

If a source user equipment and a destination user equipment are directly designated by a person or are automatically detected, it is essential for check a channel between the source user equipment and the destination user equipment. And, timing setting is a mandatory process. A user equipment should receive allocation of resources for the channel check and the timing setting from a base station. And, the source or destination user equipment, to which a role in transmitting a signal for a search is given by the baser station, is responsible for transmitting the corresponding signal. In this case, a term for maintaining the signal for the search may be regarded as an available term of a resource configured by the base station. As mentioned in the foregoing description, the direct communication situation may be categorized into a case that both of the source user equipment and the destination user equipment are well aware of the base station, a case that either the source user equipment or the destination user equipment is well aware of the base station, and a case that both of the source user equipment and the destination user equipment are not well aware of the base station. So to speak, the direct communication situation may be categorized into a case that the direct communication possibly works as interference with neighbor user equipments at a frequency of a cellular network and a case that the direct communication does not work as the interference.

Case A: Case of Interfering with Neighbors

In an environment that a direct communication possibly interferes with neighbors, two factors need to be taken into consideration. One fact is an interfering part coming from a signal structure for the direct communication and the other is the interference with another user equipment due to a resource use.

In order to reduce or eliminate interference in aspect of a signal structure, a signal structure used by a cellular network may be usable for a direct communication. For instance, in case that a cellular network uses such a structure as OFDM, CDM and the like, a direct communication may be able to use such a signal structure as OFDM, CDM and the like. Moreover, a transmission timing of a signal for a direct communication may be adjusted not to work as interference with neighbor user equipments. For instance, in case that a signal for a direct communication is transmitted using a DL signal structure, a user equipment should generate and transmit the signal for the direct communication to correspond to a DL signal timing experienced by the corresponding user equipment. In particular, if a reception timing for a DL OFDM symbol is detected, a user equipment preferably generates a signal structure precisely aligned with the corresponding timing for the direct communication and then preferably transmits a corresponding signal. The signal, which meets this condition, may include one of a preamble signal for a signal search between user equipments, a reference signal for channel estimation, a sequence for detecting an ID of a user equipment, system information for carrying information on resource configuration and the like.

In case that a signal for a direct communication is transmitted using a UL signal structure, it is possible for the signal for the direct communication to collide with a UL signal transmitted by another user equipment. To prevent this signal collision, the signal for the direct communication may have one of the following two structures. First of all, a reception timing point of a DL signal is set to a UL timing (i.e., a timing advance is assumed as 0) and the signal for the direct communication is then transmitted at the corresponding timing point using a UL structure. Secondly, the signal for the direct communication is transmitted to correspond to a UL transmission timing owned by a user equipment using a UL structure. Since the signal for the direct communication corresponds to a DL signal in a receiving side, it is possible for the former case not to cause interference with a user equipment located nearby mostly. On the other hand, the latter case may be defined as a UL timing owned by a user equipment overlaps with a DL reception unit. In this case, the signal for the direct communication may work as interference when a neighbor user equipment normally receives a DL signal. Moreover, in case of a user equipment approaching for a direct communication, interference of a macro cell may appear on a signal resource for the direct communication in receiving a signal for the direct communication.

Figure 14:
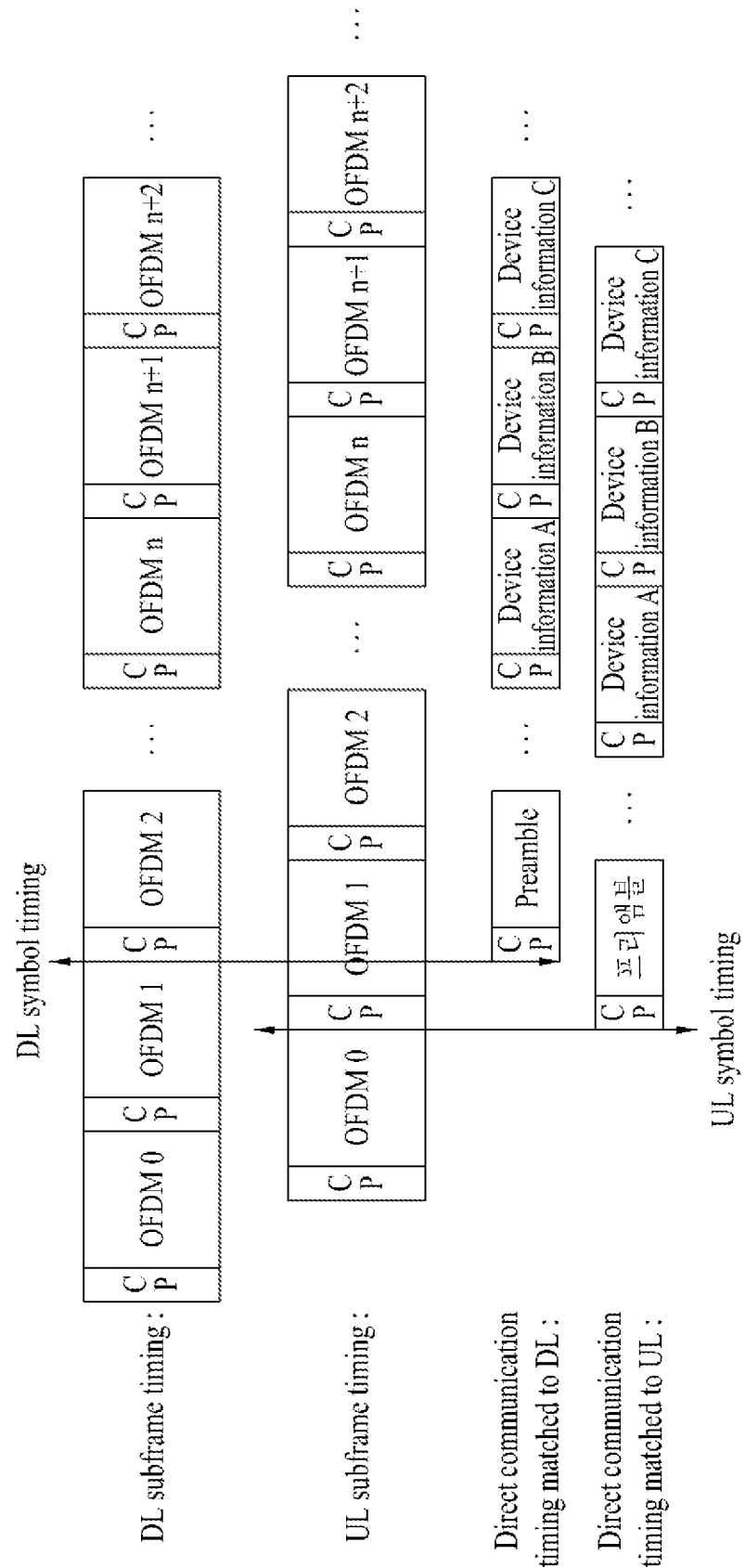
FIG. 14 is a diagram for one example of determining a transmission timing point in transmitting a signal for direct communication between user equipments according to the present invention.

FIG. 14 is a diagram for one example of matching a signal transmission timing to a DL timing and matching a signal transmission timing to a UL timing, in transmitting a signal for a direct communication. In the drawing, a reference for a signal transmission may be defined using a predetermined time unit or starting point existing on a cellular network line a subframe boundary, an OFDM (or SC-FDMA) symbol boundary or a radio frame boundary.

A resource used for a direct communication by a user equipment may be necessarily allocated by a base station. Otherwise, the base station is unable to perform coordination of interference between a user equipment performing a direct communication and a user equipment not performing the direct communication or a user equipment performing other direct communication. Therefore, it is preferable that a resource for a direct communication is basically allocated by a base station. Regarding this, how to use a DL resource and a UL resource in a direct communication zone is questioned. First of all, since a DL signal is delivered within a macro cell at an overall uniform power level, in case that a structure of a signal for a direct communication is delivered by being included in DL, it may be able to minimize interference influence on a DL user equipment from neighbors.

Meanwhile, if a power level is not adjusted, a signal transmitted by a user equipment, which performs a direct communication, may appear as interference or jamming when another user equipment existing nearby receives a DL signal. Hence, when a signal for a direct communication is transmitted using a DL structure/resource, a power level is set extremely low or a method of limiting a transmission timing is required. For instance, considering that a communication system basically uses an interleaver to prepare for burst errors, a user equipment, which performs a direct communication, is able to perform a transmission for a short time at each interleaver using an extremely high MCS level (e.g., no-channel coding, 64QAM, etc.) with a very great power. To this end, a base station may be able to directly set up a power level or transmission timing for the direct communication. Moreover, in transmitting a signal for a direct communication, a user equipment may be able to allow a power over a predetermined level at specific point(s) of a specific signal only. For instance, in case that a neighbor user equipment detects a preamble signal for a direct communication, a level of the preamble signal may be transmitted by being boosted to some extent. In doing so, a timing point or interval for transmitting a preamble may be assigned in a limited form.

When a signal for a direct communication is transmitted using a UL resource, a UL signal transmitted by a neighbor user equipment may cause excessive interference to a user equipment that performs a direct communication. To solve this problem, the user equipment performing the direct communication detects whether a user equipment causing high interference exist nearby and may be then able to report a corresponding result to a base station. For instance, a user equipment for a direct communication may be able to transmit such resource information of a received signal as time, frequency, code and the like to a base station. In doing so, features of the analyzed signal may be transmitted to the base station together with the resource information. In this case, the base station may be able to configure a UL resource for the direct communication by avoiding a resource or timing used by the corresponding user equipment in consideration of the detection result. To this end, the user equipment may need capability of monitoring an uplink or analyzing the received signal.

If it is unnecessary to consider interference with neighbors, a user equipment may be able to use random resources for a direct communication. For instance, the user equipment may be able to use a resource used by a cellular network or a resource, which uses ISM band, for the direct communication. Yet, in order to efficiently use resources, if a frequency resource used by a cellular network is used for a direct communication, a timing and resource determined by a macro cell is preferably used. Thus, it may be able to configure an optimal direct communication environment without causing an interference problem to other user equipments located nearby. On the contrary, if a band different from that of the cellular network is used for the direct communication, no restriction is put on the user equipment. Yet, in order to solve a problem of interference with other RAT or perform coordination between other direct communication user equipments, a timing and resource use structure for the direct communication may be still restricted under the control of the base station. In order to solve this problem, the user equipment performs measurement on a direct communication performed band in time/frequency domain and may be then able to report a corresponding measurement result to the base station. A position of a carrier for a direct communication may have a structure of hopping randomly or a center frequency changing structure, in accordance with time or to correspond to interference caused by another unlicensed user equipment operating nearby.

If a user equipment performing a direct communication receives a timing and device information on a user equipment transmitting a signal structure for a link D, a resource configuration information and the like, it is ready to begin a direct communication between user equipments. Thereafter, assuming that a distance between the user equipments is very short, the user equipment performing the direct communication may transmit a random access signal (e.g., an RACH preamble) for mutual connection [cf. S610 in FIG. 6], which may be used to acquire a presence or non-presence of a user equipment for establishing the link D instead of being used for timing information estimation. Hence, if the random access signal is transmitted [cf. S610 in FIG. 6], the user equipment responsible for the control should inform a counterpart user equipment of a structure of a resource (e.g., a resource for a source user equipment to transmit data, a resource for a destination user equipment to receive data, etc.) to be used [cf. S620 in FIG. 6]. In particular, this information may be delivered by a random access channel process. Considering a hardware structure of a user equipment, signal transmission/reception may be preferably performed in DL form. Yet, if restriction is put on a use of DL, the user equipment may be able to transmit/receive a signal in DL form.

HARQ may be omitted in a direct communication in accordance with a situation and may be activated as ARQ only. ACK/NACK structure in PHY may be transmitted in a manner of reusing ACK/NACK channel in a macro cell. Alternatively, ACK/NACK may be transmitted in a manner of simply delivering used resource information or data rather than using a control channel for the ACK/NACK transmission. In particular, ACK/NACK may be defined as a sort of small packet.

Preferably, the direct communication does not use CSI-RS/C-RS (channel status information reference signal/cell-specific RS). And, the direct communication may assume such a form as AWGN channel due to short range communication. Moreover, irrespective of an RS structure of macro cell, a user equipment may be able to define and use a device-specific RS in a direct communication.

If M2M (machine-to-machine) devices exist and an M2M server manages the M2M devices, the above description may be regarded as a model that a specific device plays a role as an aggregator when the M2M server approaches each of the M2M devices via a base station. Meanwhile, if an owner, who manages the M2M devices, performs management by being located in the vicinity of the corresponding devices, delivering data to a management device of the corresponding owner in direct is more preferable than delivering data to a base station. Comparing this case to a case of using another RAT (e.g., WiFi, Bluetooth, Zigbee, etc.), since the M2M device may not need to include a modem for multi-RAT, it may be able to configure an inexpensive eco-system. Moreover, since the multi-RAT is not used, it may be unnecessary to implement a processing configuration for unnecessary application layers. Moreover, as an air-interface for a device-to-device communication and an air-interface for a device-to-base station communication are designed in an integrated manner, it may be able to overcome inefficiency that may be caused by multi-RAT based independent design.

In particular, a single RAT is utilized to be allowed for a short range communication up to a cellular network access, whereby a very efficient eco-system of M2M devices can be configured. This feature may be exactly applicable to a human device. According to an embodiment of the present invention, both a short range communication and a long range communication can be performed via a device having low complexity with small power. And, an active QoS (quality of service) management is enabled to efficiently manage power consumption level and throughput.

Figure 15:
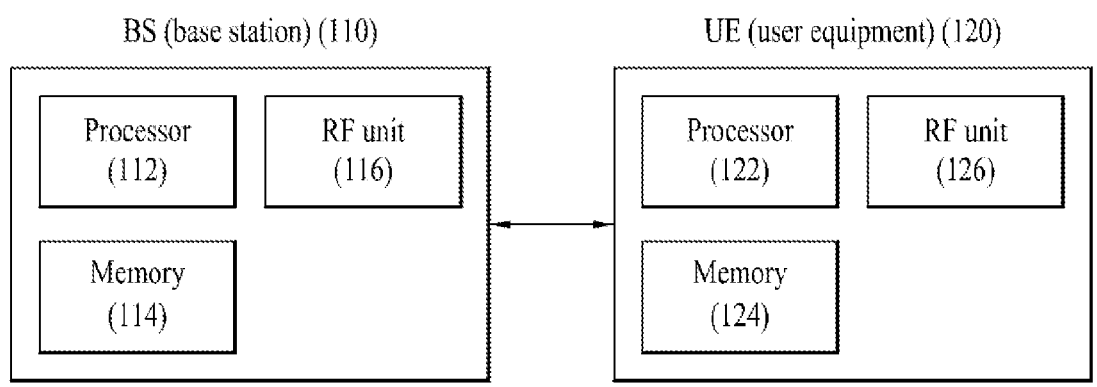
FIG. 15 is a diagram for one example of a base station and a user equipment applicable to the present invention.

FIG. 15 is a diagram for one example of a base station and a user equipment applicable to one embodiment of the present invention.

Referring to FIG. 15, a wireless communication system may include a base station (BS) 110 and a user equipment (UE) 120. The base station 110 may include a processor 112, a memory 114 and a radio frequency (RF) unit 116. The processor 112 may be configured to implement the procedures and/or methods proposed by the present invention. The memory 114 is connected with the processor 112 to store various kinds informations related to operations of the processor 112. The RF unit 116 is connected with the processor 112 and then transmits and/or receives radio signals. The user equipment 120 may include a processor 122, a memory 124 and a radio frequency (RF) unit 126. The processor 122 may be configured to implement the procedures and/or methods proposed by the present invention. The memory 124 is connected with the processor 122 to store various kinds informations related to operations of the processor 122. The RF unit 126 is connected with the processor 122 and then transmits and/or receives radio signals. The base station 110 and/or the user equipment 120 may have a single antenna or multiple antennas.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, embodiments of the present invention are described centering on the data transmission/reception relations between a base station and a user equipment. In this disclosure, a specific operation explained as performed by a base station may be performed by an upper node of the base station in some cases. In particular, in a network constructed with a plurality of network nodes including a base station, it is apparent that various operations performed for communication with a user equipment may be performed by a base station or other networks except the base station. In this case, 'base station' can be replaced by such a terminology as a fixed station, a Node B, an eNode B (eNB), an access point and the like. And, 'terminal' may be replaced by such a terminology as a user equipment (UE), a mobile station (MS), a mobile subscriber station (MSS) and the like.

Embodiments of the present invention may be implemented using various means. For instance, embodiments of the present invention may be implemented using hardware, firmware, software and/or any combinations thereof. In case of the implementation by hardware, one embodiment of the present invention may be implemented by one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then drivable by a processor. The memory unit may be provided within or outside the processor to exchange data with the processor through the various means known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Accordingly, the present invention is applicable to such a wireless communication device as a user equipment, a relay node, a base station and the like.

What is claimed is:

1. A method of transmitting a data signal at a first user equipment (UE) in a wireless communication system, the method comprising:
   receiving a downlink control information from a base station, the downlink control information including resource allocation information and being masked with an identifier; and
   transmitting the data signal in an uplink subframe in accordance with indication of the downlink control information,
   wherein, if the identifier is a cell radio network temporary identifier (C-RNTI):
      a starting transmission timing of the data signal is set to be advanced from a starting point of a downlink subframe of the base station corresponding to the uplink subframe, and
      the data signal is transmitted to the base station, and
   wherein, if the identifier is a UE-to-UE direct communication group identifier:
      a starting transmission timing of the data signal is set to be identical with the starting point of the downlink subframe of the base station corresponding to the uplink subframe, and
      the data signal is transmitted to a second UE.

2. The method of claim 1, wherein the C RNTI identifier is masked on a cyclic redundancy check (CRC) of the downlink control information.

3. A user equipment (UE) configured to transmit a data signal in a wireless communication system, the UE comprising:
   a radio frequency (RF) unit; and
   a processor configured to:
      receive a downlink information signal from a base station, the downlink control information including resource allocation information and being masked with an identifier; and
      transmit the data signal in an uplink subframe in accordance with indication of the downlink control information,
   wherein, if the identifier is a cell radio network temporary identifier (C-RNTI):
      a starting transmission timing of the data signal is set to be advanced from a starting point of a downlink subframe of the base station corresponding to the uplink subframe, and
      the data signal is transmitted to the base station, and
   wherein, if the identifier is a UE-to-UE direct communication group identifier:
      a starting transmission timing of the data signal is set to be identical with the starting point of the downlink subframe of the base station corresponding to the uplink subframe, and
      the data signal is transmitted to another UE.

4. The UE of claim 3, wherein the identifier is masked on a cyclic redundancy check (CRC) of the downlink control information.

* * * * *